(12) United States Patent
Oh

(10) Patent No.: US 7,579,043 B2
(45) Date of Patent: Aug. 25, 2009

(54) METHOD OF MANUFACTURING SUBSTRATE FOR LIQUID CRYSTAL DISPLAY DEVICE

(75) Inventor: Tae Young Oh, Anyang-si (KR)

(73) Assignee: LG. Display Co., Ltd., Seoul (KR)

( * ) Notice: Subject to any disclaimer, the term of this patent is extended or adjusted under 35 U.S.C. 154(b) by 559 days.

(21) Appl. No.: 11/207,241

(22) Filed: Aug. 18, 2005

(65) Prior Publication Data

US 2006/0141129 A1    Jun. 29, 2006

(30) Foreign Application Priority Data

Dec. 23, 2004    (KR) .................. 10-2004-0111152

(51) Int. Cl.
*B05D 5/00* (2006.01)
(52) U.S. Cl. .................. 427/256; 349/187; 359/44; 359/86; 359/90; 359/43; 359/45; 427/271; 427/277; 427/278; 427/428.01; 427/58
(58) Field of Classification Search ........... 349/187; 359/44
See application file for complete search history.

(56) References Cited

U.S. PATENT DOCUMENTS 5,548,420 A * 8/1996 Koshimizu et al. ......... 349/21
2004/0125328 A1* 7/2004 Chae et al. .................. 349/187

FOREIGN PATENT DOCUMENTS

| JP | 05-011270 | | 1/1993 |
| JP | 05011270 | * | 1/1993 |
| JP | 06-000939 | | 1/1994 |
| JP | 06-023948 | | 2/1994 |
| JP | 06-166165 | | 6/1994 |
| JP | 07-140314 | | 6/1995 |
| JP | 11-058921 | | 3/1999 |
| JP | 11-091229 | | 4/1999 |
| JP | 11-198337 | | 7/1999 |
| JP | 2000-289320 | | 10/2000 |
| JP | 2001-056405 | | 2/2001 |
| KR | 2003015778 | * | 2/2003 |
| KR | 2003015778 A | * | 2/2003 |
| KR | 2003015778 A | * | 2/2003 |

* cited by examiner

*Primary Examiner*—Michael Barr
*Assistant Examiner*—Andrew Bowman
(74) *Attorney, Agent, or Firm*—Brinks Hofer Gilson & Lione

(57) ABSTRACT

A method of forming a substrate for an LCD device includes the steps of forming a column spacer pattern in a printing roll, forming an overcoat layer pattern in the printing roll provided with the column spacer pattern, and c) rotating the printing roll on the substrate to simultaneously transfer the overcoat layer pattern and the column spacer pattern onto the substrate. Since both the column spacer pattern and the overcoat layer pattern are formed in one printing roll, the column spacer and the overcoat layer can be formed simultaneously on the substrate through a single transfer process. This reduces the process time and thus facilitates mass production.

25 Claims, 23 Drawing Sheets

METHOD OF MANUFACTURING SUBSTRATE FOR LIQUID CRYSTAL DISPLAY DEVICE

This application claims the benefit of Korean Application No. P2004-111152, filed on Dec. 23, 2004, which is hereby incorporated by reference as if fully set forth herein.

TECHNICAL FIELD

The present invention relates to a liquid crystal display (LCD) device, and more particularly, to a method of forming an overcoat layer and a column spacer of an LCD device.

BACKGROUND

An ultra thin flat panel display device has a display screen with a thickness of several centimeters. Especially, an LCD device among the flat panel display device is widely used for monitors of notebook computers, spacecrafts, and aircrafts, owing to features and advantages of low driving voltage, low power consumption, and portable size.

The LCD device includes a lower substrate, an upper substrate, and a liquid crystal layer formed between the substrates. Alignment of the liquid crystal layer is controlled depending on the presence of electric field and light transmittance is correspondingly controlled to display a picture.

However, the LCD device has a drawback of a narrow viewing angle range. To solve such a drawback, there were suggested a multi-domain LCD device, a vertically aligned (VA) mode LCD device, an in-plane switching (IPS) mode LCD device, and so on.

Of them, the IPS mode LCD device is designed to drive a liquid crystal through IPS generated between two electrodes formed in parallel. Hereinafter, a related art IPS mode LCD device will be described with reference to the accompanying drawings.

FIG. 1 is a sectional view illustrating a related art IPS mode LCD device, and FIG. 2A to FIG. 2D are sectional views illustrating a process of manufacturing a column space in a process of manufacturing an upper substrate of the related art IPS mode LCD device.

As shown in FIG. 1, a common electrode 12 and a pixel electrode 16 are formed in parallel on a lower substrate 10 by interposing an insulating film 14 therebetween.

A light-shielding layer 22 and a color filter layer 24 are formed on an upper substrate 20, and an overcoat layer 26 is formed on the light-shielding layer 22 and the color filter layer 24 to planarize the substrate 20.

A column spacer 30 is formed between the substrates 10 and 20 to maintain a cell gap. A sealant 40 is formed on outer regions of the substrates to bond the substrates 10 and 20 together. Also, although not shown, a liquid crystal layer is formed between the substrates 10 and 20.

At this time, the column spacer 30 is in contact with the lower substrate 10 by the bonding process between the substrates 10 and 20 after it is formed on the overcoat layer 26 of the upper substrate 20. A method of forming the column spacer 30 will now be described.

First, as shown in FIG. 2A, the overcoat layer 26 is formed on the upper substrate 20 where the light-shielding layer 22 and the color filter layer 24 are formed.

Then, as shown in FIG. 2B, a material 30a for the column spacer is formed on the overcoat layer 26.

Subsequently, as shown in FIG. 2C, a mask 38 having a predetermined pattern is disposed on the material 30a for the column spacer and light is irradiated thereon using a light irradiator (not shown).

Afterwards, as shown in FIG. 2D, the column spacer pattern 30 is completed by a developing process.

As described above, the column spacer pattern 30 is formed by the photolithographic process including the light irradiation and the developing process.

The photolithographic process has several drawbacks. First, the manufacturing cost increases because the photolithographic process requires the mask 38 and the light irradiator of high cost. Also, the process steps are complicated and the process time is long because exposing and developing processes are required.

BRIEF SUMMARY

Accordingly, the present invention is directed to a method of manufacturing a substrate for an LCD device that substantially obviate one or more problems due to limitations and disadvantages of the related art.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these advantages and in accordance with the invention, as embodied and broadly described herein, a method of forming a substrate for an LCD device includes the steps of a) forming a column spacer pattern on a printing roll, b) forming an overcoat layer pattern on the printing roll overlying the column spacer pattern, and c) rotating the printing roll on the substrate to simultaneously transfer the overcoat layer pattern and the column spacer pattern onto the substrate.

In the present invention, since the column spacer pattern is formed using the printing roll, a device of high cost is not required unlike the related art photolithographic process. Also, since no exposing and developing processes are required, the process steps can be reduced. Particularly, since both the column spacer pattern and the overcoat layer pattern are formed in one printing roll, the column spacer and the overcoat layer can be formed simultaneously on the substrate through a transfer process of one time. This reduces the process time and thus facilitates mass production.

In another embodiment, a method of forming a substrate for an LCD device includes forming a light-shielding layer and a color filter layer on the substrate; forming a column spacer pattern on a printing roll; forming an overcoat layer pattern on the printing roll overlying the column spacer pattern; and rotating the printing roll on the substrate to simultaneously transfer the overcoat layer pattern and the column spacer pattern onto the substrate, wherein the column spacer pattern overlies the overcoat layer and is substantially aligned with the light-shielding layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

FIRST EMBODIMENT

FIG. 3A to FIG. 3E are sectional views illustrating a method of forming a substrate for an LCD device according to the first embodiment of the present invention.

Figure 1:
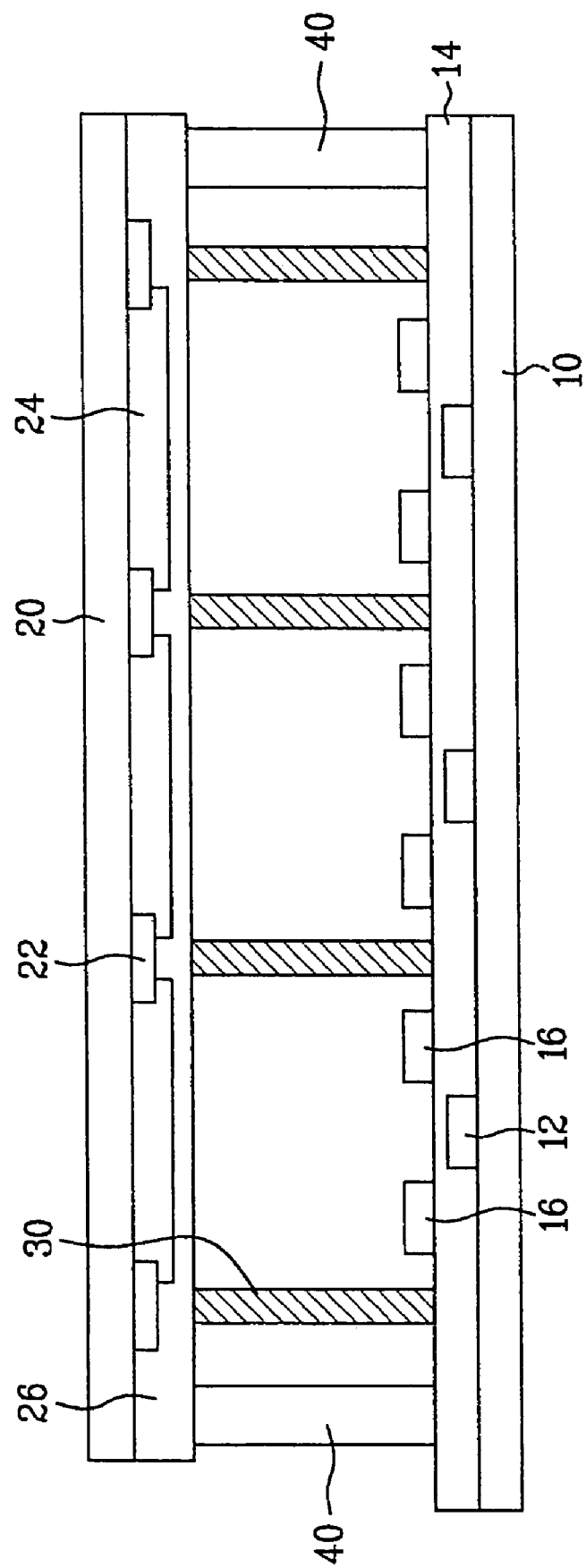
FIG. 1 is a sectional view illustrating a related art IPS mode LCD device.
Figure 2A:
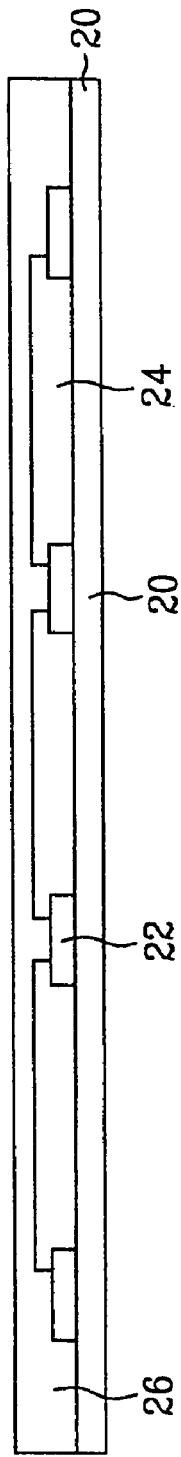
FIG. 2A to FIG. 2D are sectional views illustrating a process of manufacturing a column space in a process of manufacturing an upper substrate of the related art IPS mode LCD device.
Figure 2B:
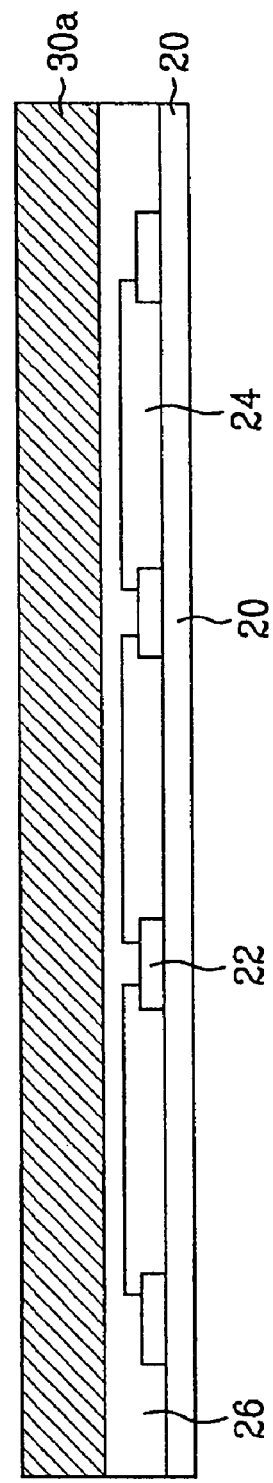
Figure 2C:
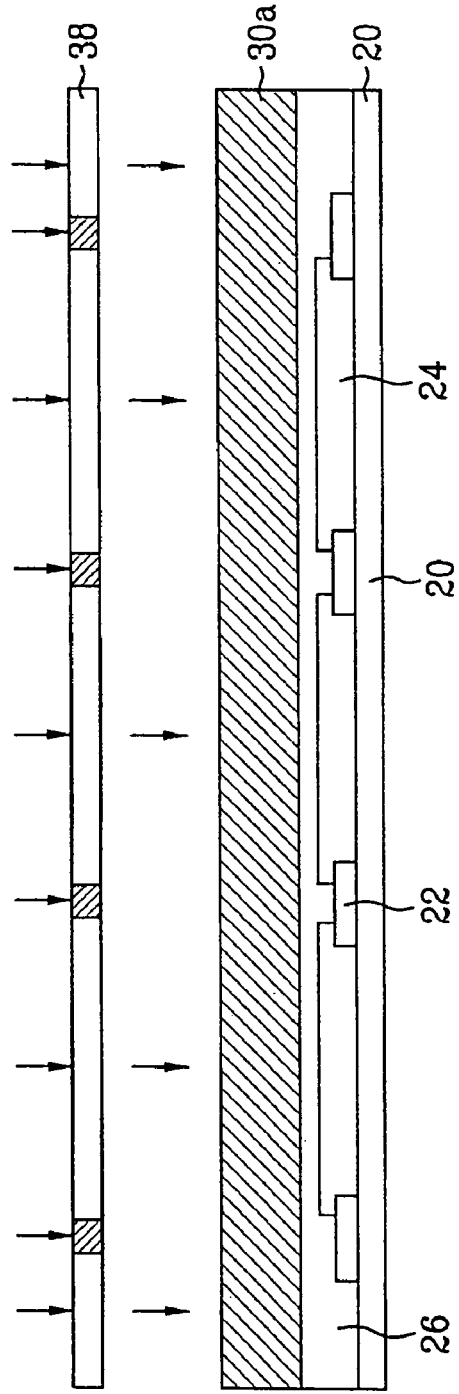
Figure 2D:
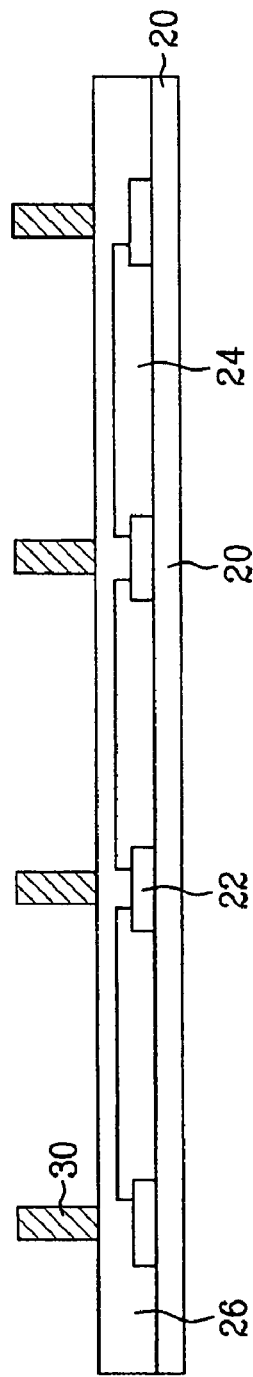
Figure 3A:
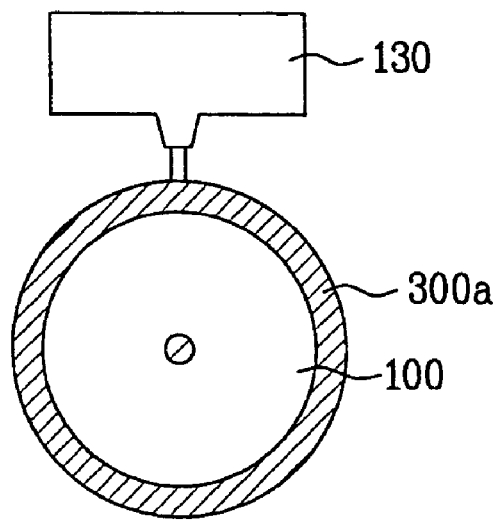
FIG. 3A to FIG. 3E are sectional views illustrating a method of forming a substrate for an LCD device according to the first embodiment of the present invention.

As shown in FIG. 3A, a material 300*a* for a column spacer is deposited on a printing roll 100 using a printing device 130.

Figure 3B:
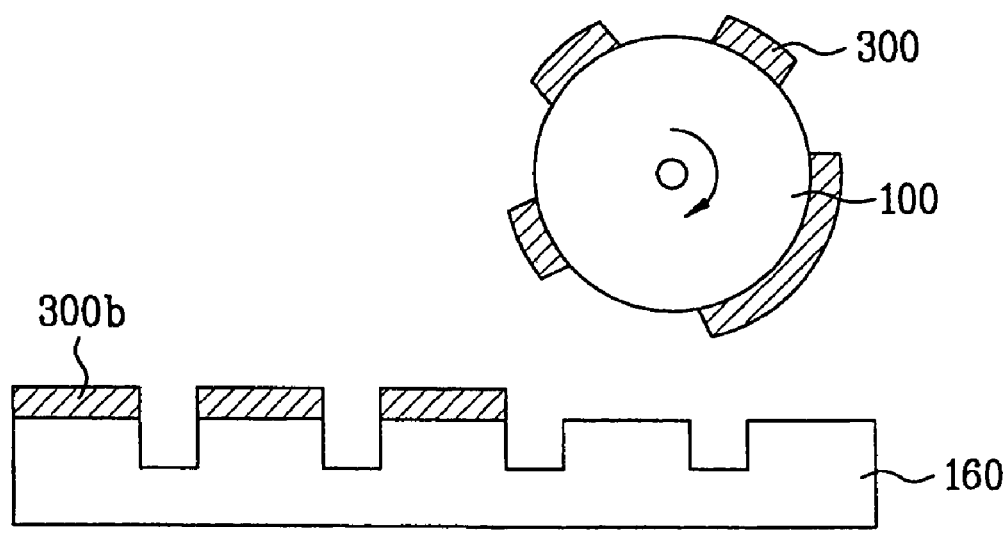

Then, as shown in FIG. 3B, the printing roll 100 is rotated on a printing plate 160 provided with a projection having a predetermined shape so that a material 300*b* for a column spacer is partially transferred onto the projection of the printing plate 160 to form a column spacer 300 having a predetermined shape in the printing roll 100.

Figure 3C:
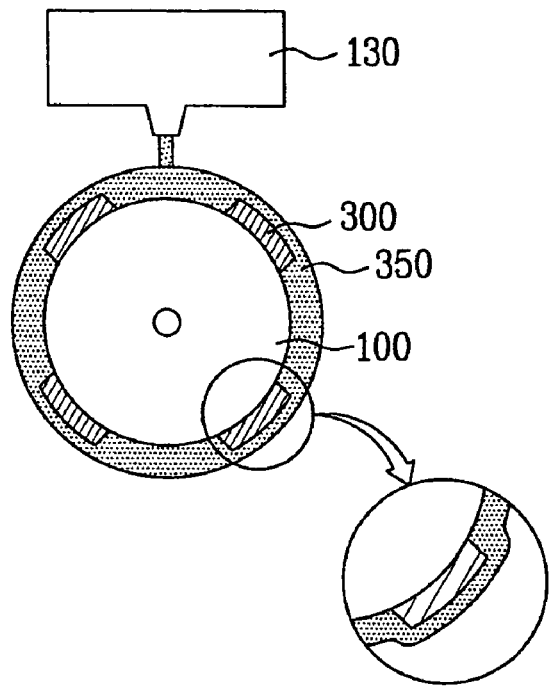

Subsequently, as shown in FIG. 3C, an overcoat layer 350 is deposited on the printing roll 100 where the column spacer 300 is formed, using the printing device 130.

Figure 3D:
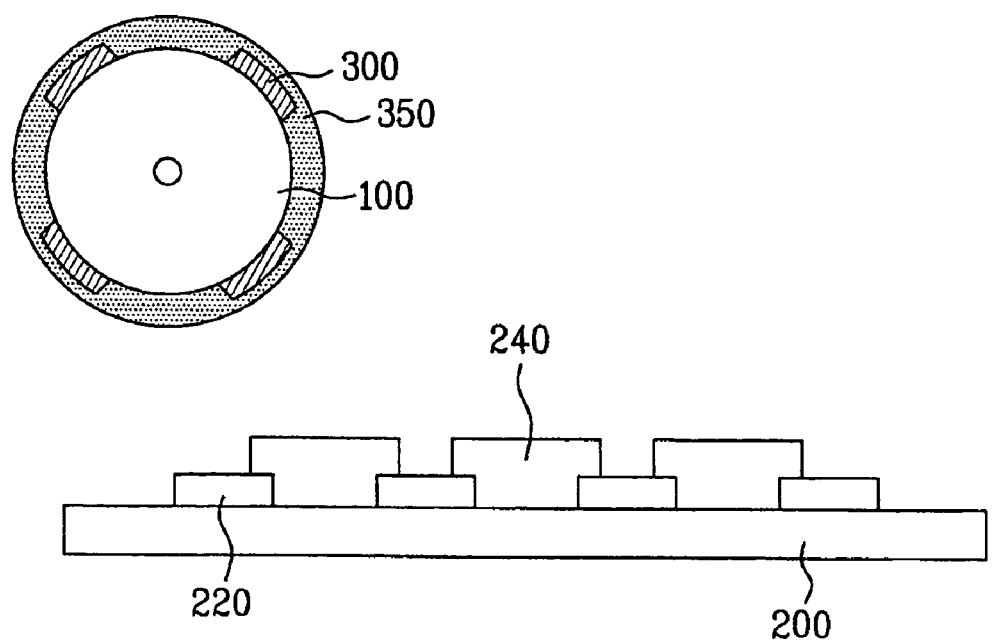
Figure 3E:
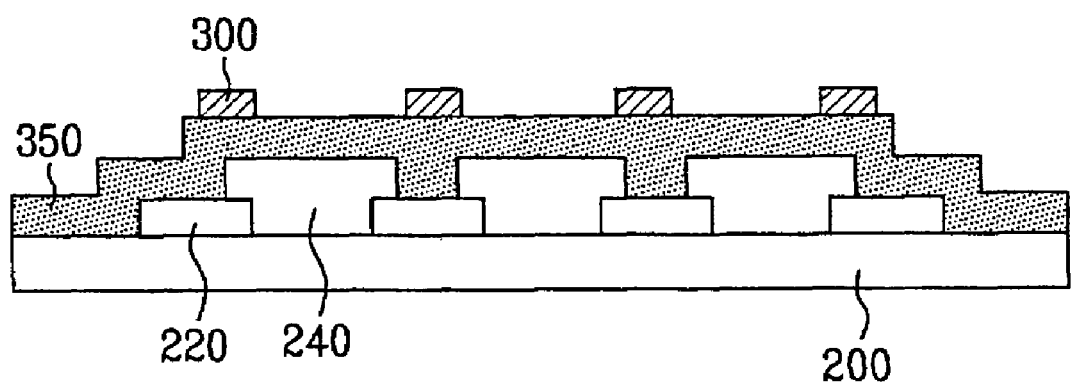

Afterwards, as shown in FIG. 3D and FIG. 3E, the printing roll 100 is rotated on a substrate 200 so that the column spacer 300 and the overcoat layer 350 are simultaneously transferred onto the substrate 200, thereby transferring the overcoat layer 350 and the column spacer 300 to the substrate 200.

Meanwhile, in an IPS mode LCD device, a light-shielding layer 220 and a color filter layer 240 are formed on the substrate 200 as shown. The overcoat layer 350 and the column spacer 300 are sequentially formed on the light-shielding layer 220 and the color filter layer 240. At this time, the column spacer 300 is preferably formed on the light-shielding layer 220 to minimize reduction of light transmittance.

Preferably, the column spacer 300 is formed of an acrylic material. A photoinitiator should be added to the acrylic material of the column spacer according to the related art because the photolithographic process is required to form the column spacer. However, no photoinitiator is required in the present invention because the photolithographic process is not used.

Further, the column spacer 300 may be formed in such a manner that a ball type spacer or a fixed type spacer is dispersed into the acrylic material.

The overcoat layer 350 may be formed of the acrylic material. In this case, it is preferable that an adhesive enhancer is added to the acrylic material to enhance adhesion onto the printing roll 100 deposited with the column spacer 300.

SECOND EMBODIMENT

FIG. 4A to FIG. 4F are sectional views illustrating a method of forming a substrate for an LCD device according to the second embodiment of the present invention.

Figure 4A:
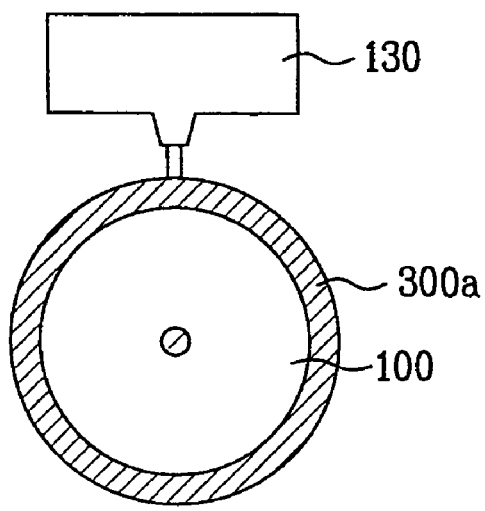
FIG. 4A to FIG. 4F are sectional views illustrating a method of forming a substrate for an LCD device according to the second embodiment of the present invention.
Figure 4B:
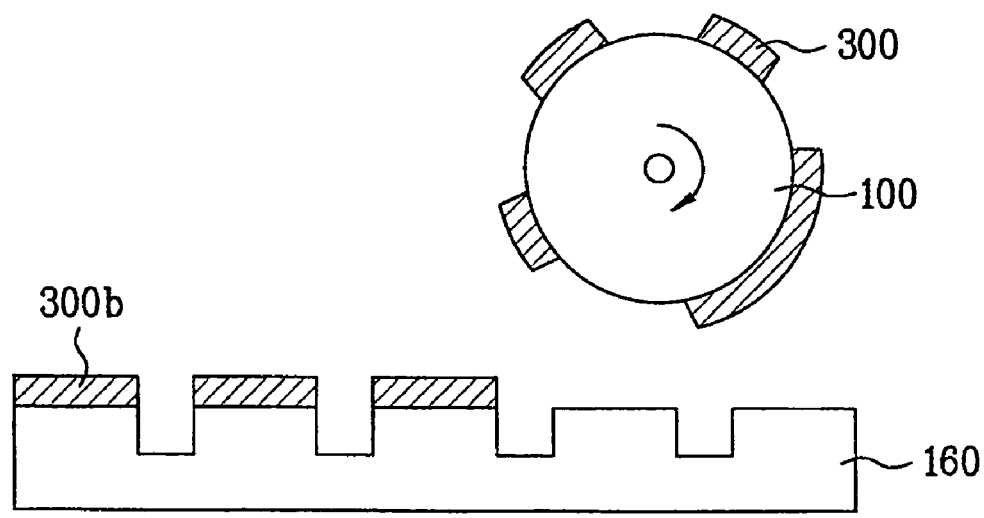
Figure 4C:
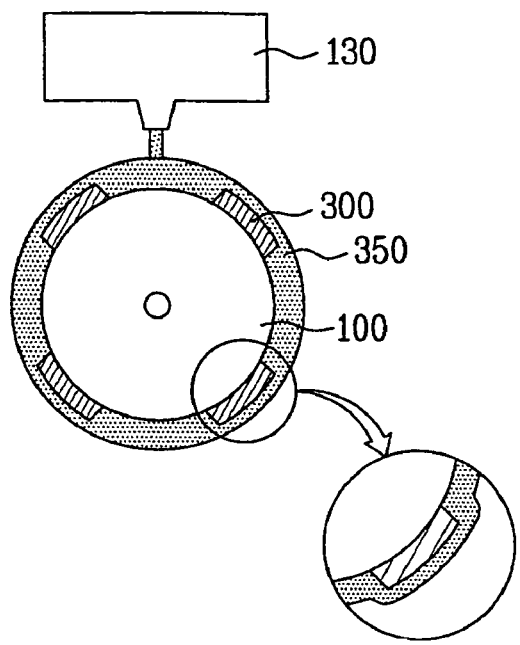
Figure 4D:
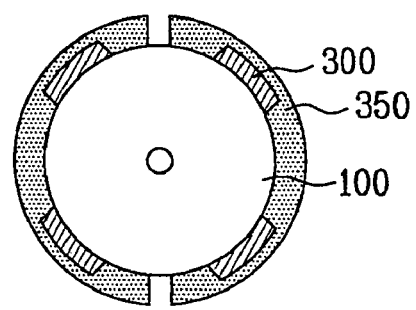
Figure 4D:
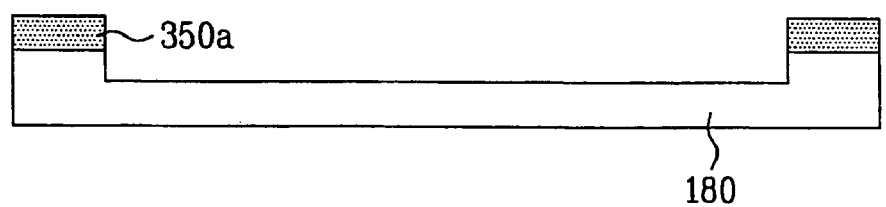
Figure 4E:
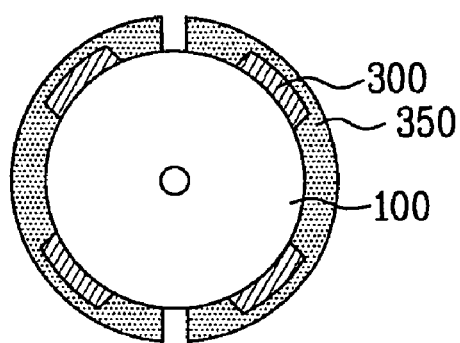
Figure 4E:
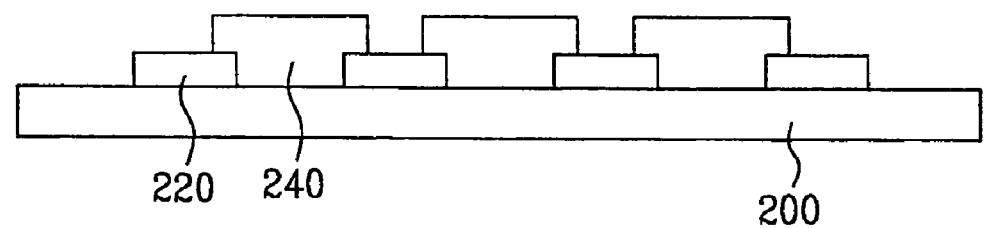
Figure 4F:
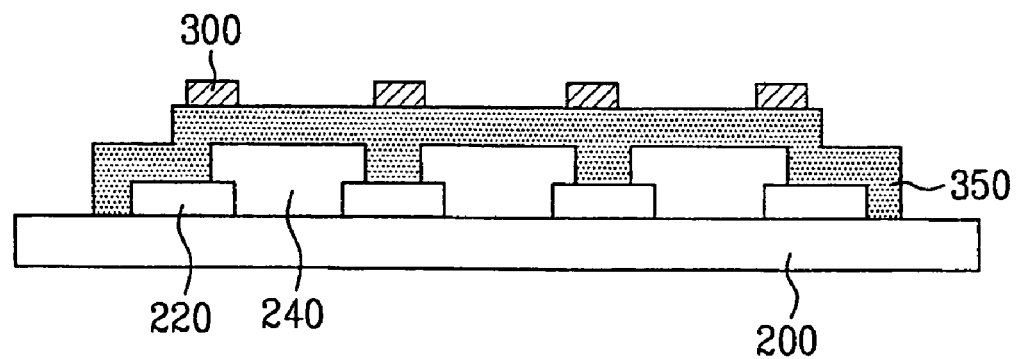

The second embodiment is similar the first embodiment except that a predetermined region of the overcoat layer 350 is additionally removed after the overcoat layer is deposited on the printing roll 100 (see FIG. 3C). Therefore, the same reference numbers will be used throughout the drawings to refer to the same or like parts, and their description will be omitted. That is, since FIG. 4A to FIG. 4C are the same as FIG. 3A to FIG. 3C, their description will be omitted. FIG. 4D to FIG. 4F will now be described.

As shown in FIG. 4D, the printing roll 100 provided with the column spacer 300 and the overcoat layer 350 is rotated on a second printing plate 180 provided with a convex structure having a predetermined shape. Thus, some region 350*a* of the overcoat layer corresponding to a region where the column spacer 300 is not formed is transferred onto the convex structure of the second printing plate 180 and then removed.

Afterwards, as shown in FIG. 4E and FIG. 4F, the printing roll 100 is rotated on the substrate 200 where the light-shielding layer 220 and the color filter layer 240 are formed, so that the column spacer 300 and the overcoat layer 350 are simultaneously transferred onto the substrate 200, thereby transferring the overcoat layer 350 and the column spacer 300 to the substrate 200.

At this time, unlike FIG. 3E of the first embodiment, the overcoat layer 350 is not formed at both sides of the substrate 200 as shown in FIG. 4F as some region 350*a* of the overcoat layer is removed. This is to improve adhesion of a sealant to be formed later. That is, after the overcoat layer 350 and the column spacer 300 are formed on the substrate 200, it is preferable that the sealant is formed at both sides of the substrate where the overcoat layer is removed. This is to obtain excellent adhesion between two substrates during a bonding process of the LCD device by directly forming the sealant on the substrate 200 not the overcoat layer.

THIRD EMBODIMENT

FIG. 5A to FIG. 5E are sectional views illustrating a method of forming a substrate for an LCD device according to the third embodiment of the present invention.

Figure 5A:
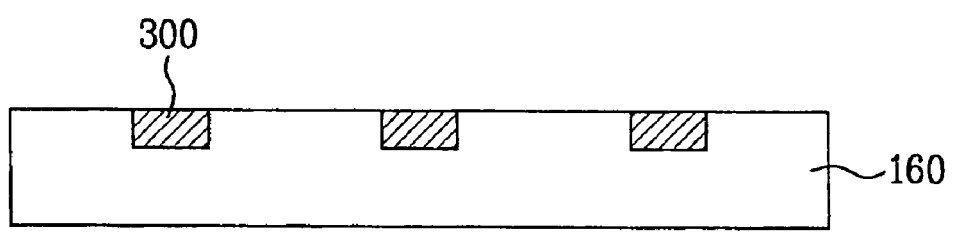
FIG. 5A to FIG. 5E are sectional views illustrating a method of forming a substrate for an LCD device according to the third embodiment of the present invention.

As shown in FIG. 5A, the column spacer 300 is deposited on the printing plate 160 provided with a recess having a predetermined shape.

Figure 5B:
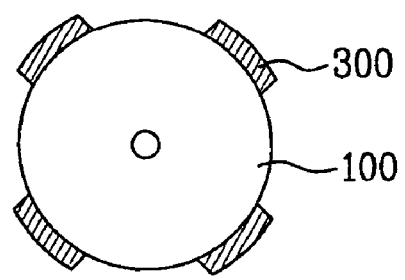
Figure 5B:

Then, as shown in FIG. 5B, the printing roll 100 is rotated on the printing plate 160 so that the column spacer 300 formed in the recess of the printing plate 160 is transferred onto the printing roll 100.

Figure 5C:
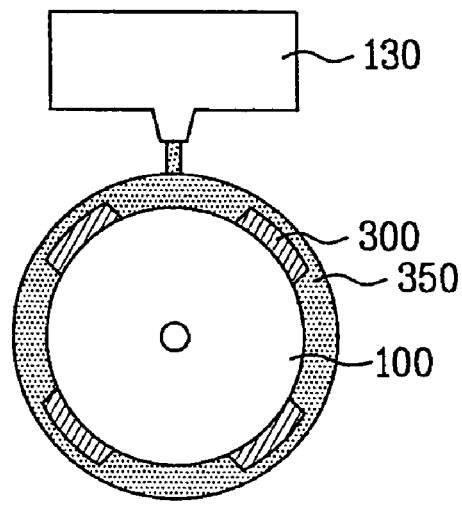

Subsequently, as shown in FIG. 5C, the overcoat layer 350 is deposited on the printing roll 100 where the column spacer 300 is formed, using the printing device 130.

Figure 5D:
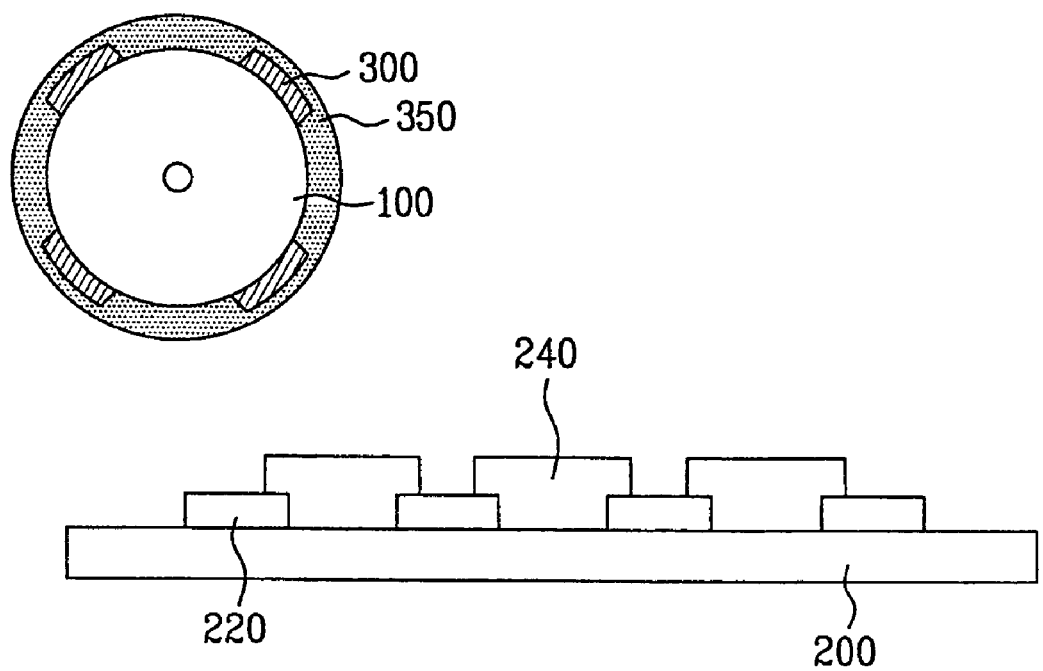
Figure 5E:
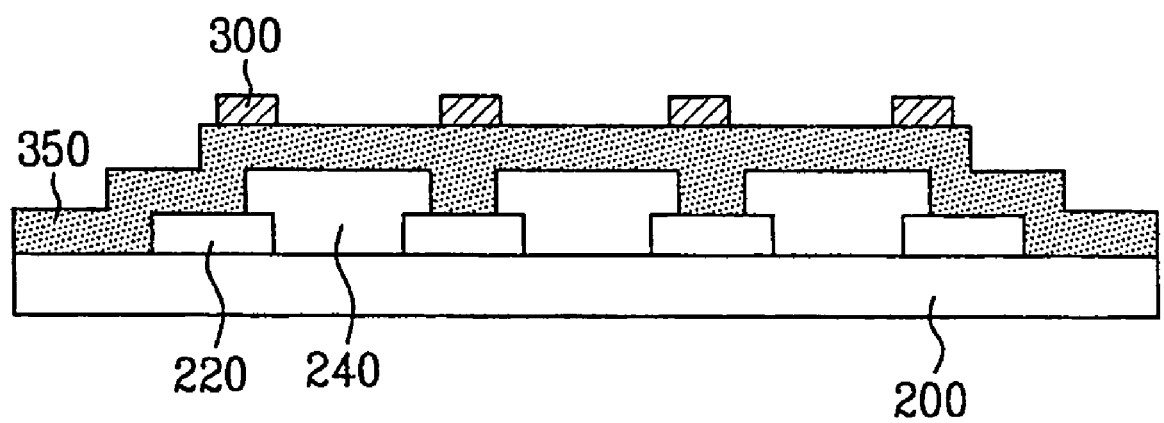

Afterwards, as shown in FIG. 5D and FIG. 5E, the printing roll 100 is rotated on the substrate 200 where the light-shielding layer and the color filter layer 240 are formed, so that the column spacer 300 and the overcoat layer 350 are simultaneously transferred onto the substrate 200, thereby transferring the overcoat layer 350 and the column spacer 300 to the substrate 200.

The column spacer 300 and the overcoat layer 350 are formed of the same material as that of the first embodiment.

FOURTH EMBODIMENT

FIG. 6A to FIG. 6F are sectional views illustrating a method of forming a substrate for an LCD device according to the fourth embodiment of the present invention.

Figure 6A:
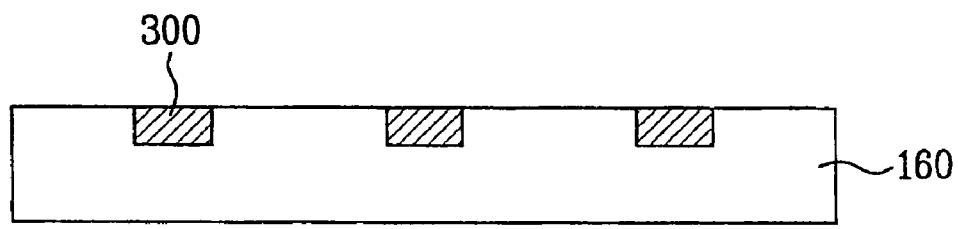
FIG. 6A to FIG. 6F are sectional views illustrating a method of forming a substrate for an LCD device according to the fourth embodiment of the present invention.
Figure 6B:
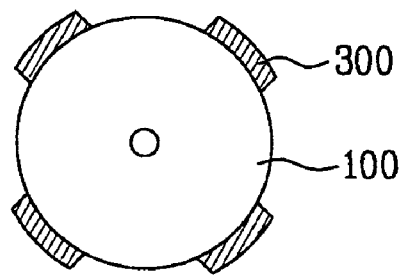
Figure 6B:
Figure 6C:
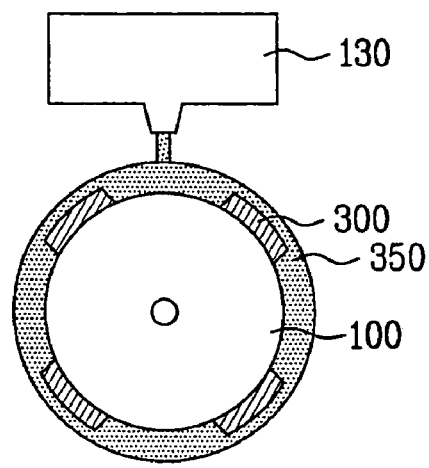
Figure 6D:
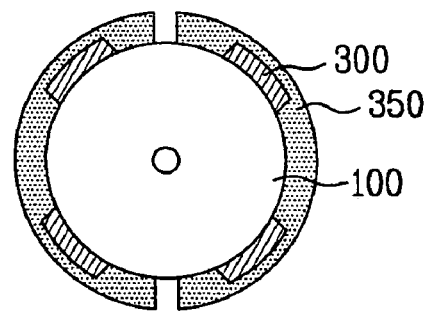
Figure 6D:
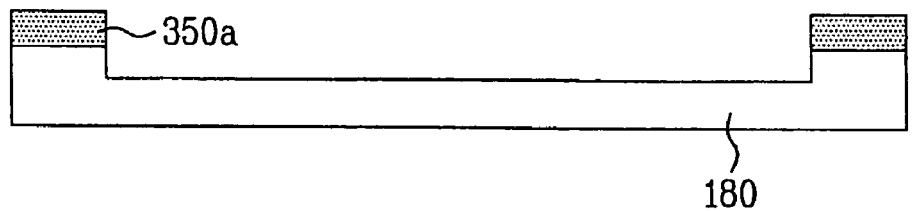
Figure 6E:
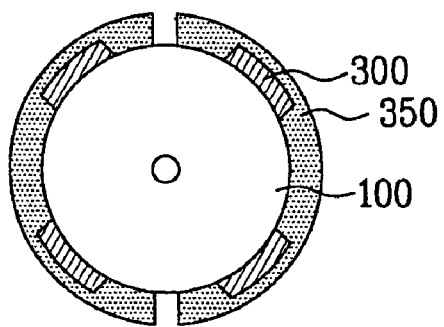
Figure 6E:
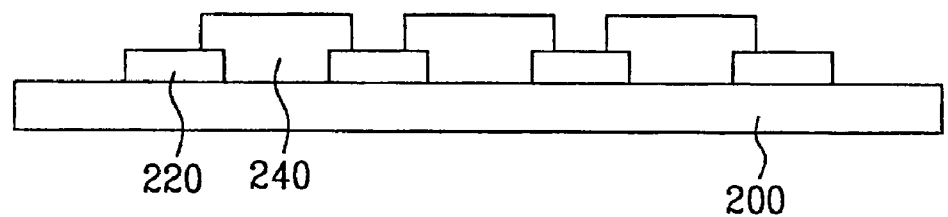
Figure 6F:
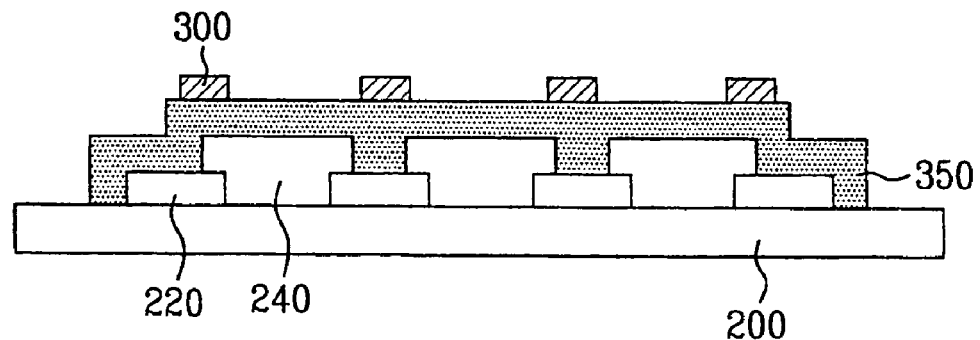

The fourth embodiment is similar to the third embodiment except that a predetermined region of the overcoat layer 350 is additionally removed after the overcoat layer is deposited on the printing roll 100 (see FIG. 5C). Therefore, the same reference numbers will be used throughout the drawings to refer to the same or like parts, and their description will be omitted. That is, since FIG. 6A to FIG. 6C are the same as FIG. 5A to FIG. 5C, their description will be omitted. FIG. 6D to FIG. 6F will now be described.

As shown in FIG. 6D, the printing roll 100 provided with the column spacer 300 and the overcoat layer 350 is rotated on the second printing plate 180 provided with a convex structure having a predetermined shape. Thus, some region 350a of the overcoat layer corresponding to a region where the column spacer 300 is not formed is transferred onto the convex structure of the second printing plate 180 and then removed.

Afterwards, as shown in FIG. 6E and FIG. 6F, the printing roll 100 is rotated on the substrate 200 where the light-shielding layer 220 and the color filter layer 240 are formed, so that the column spacer 300 and the overcoat layer 350 are simultaneously transferred onto the substrate 200, thereby completing the overcoat layer 350 and the column spacer 300 on the substrate 200.

At this time, in a manner similar to the third embodiment, after the overcoat layer 350 and the column spacer 300 are formed on the substrate 200, it is preferable that the sealant is formed at both sides of the substrate 200 where the overcoat layer 350 is removed.

FIFTH EMBODIMENT

FIG. 7A to FIG. 7E are sectional views illustrating a method of forming a substrate for an LCD device according to the fifth embodiment of the present invention.

Figure 7A:
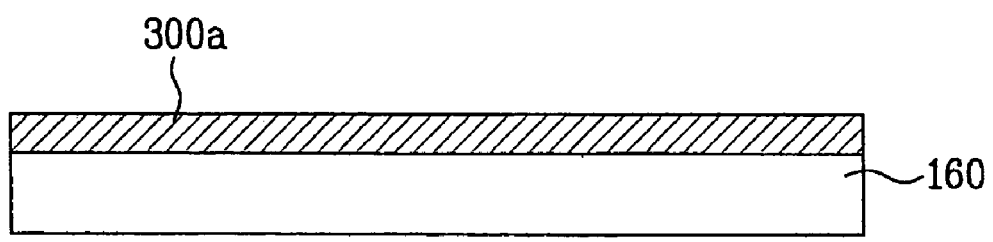
FIG. 7A to FIG. 7E are sectional views illustrating a method of forming a substrate for an LCD device according to the fifth embodiment of the present invention.

As shown in FIG. 7A, the material 300a for the column spacer is deposited on the printing plate 160.

Figure 7B:
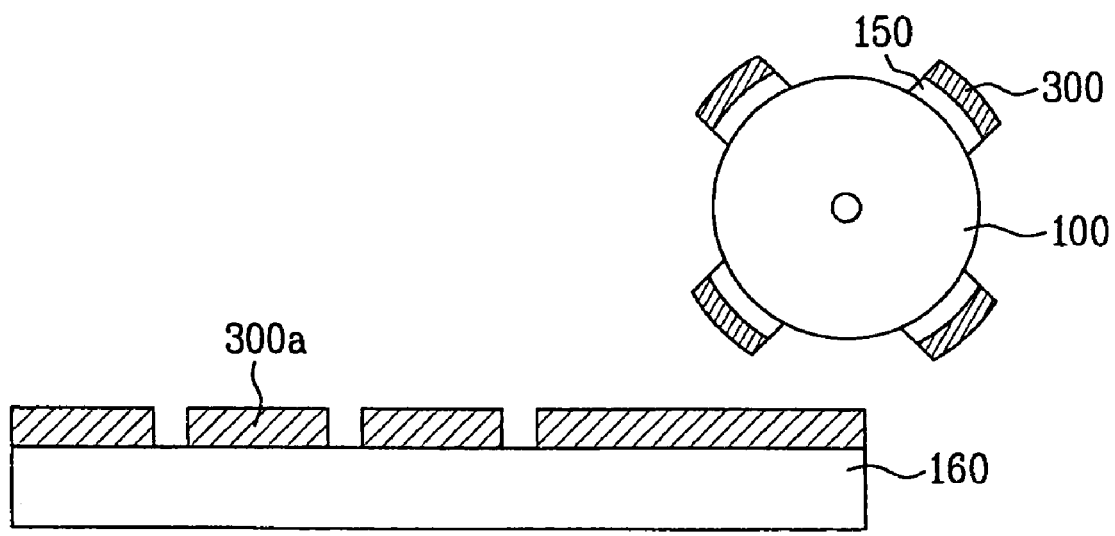

Then, as shown in FIG. 7B, the printing roll 100 provided with a convex structure 150 having a predetermined shape is rotated on the printing plate 160 provided with the material 300a for the column spacer, so that the column spacer 300 is transferred onto the convex 150.

Figure 7C:
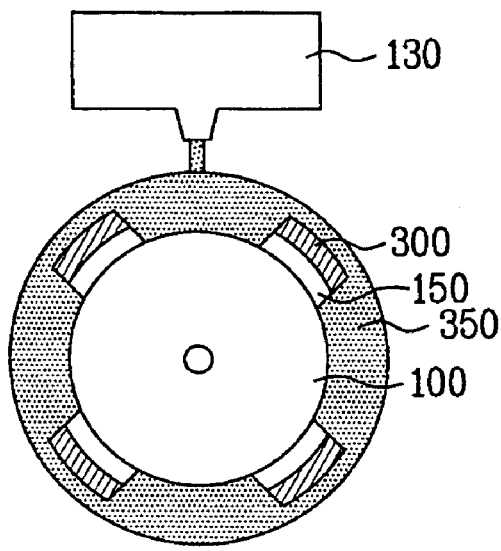

Subsequently, as shown in FIG. 7C, the overcoat layer 350 is deposited on the printing roll 100 where the column spacer 300 is formed, using the printing device 130.

Figure 7D:
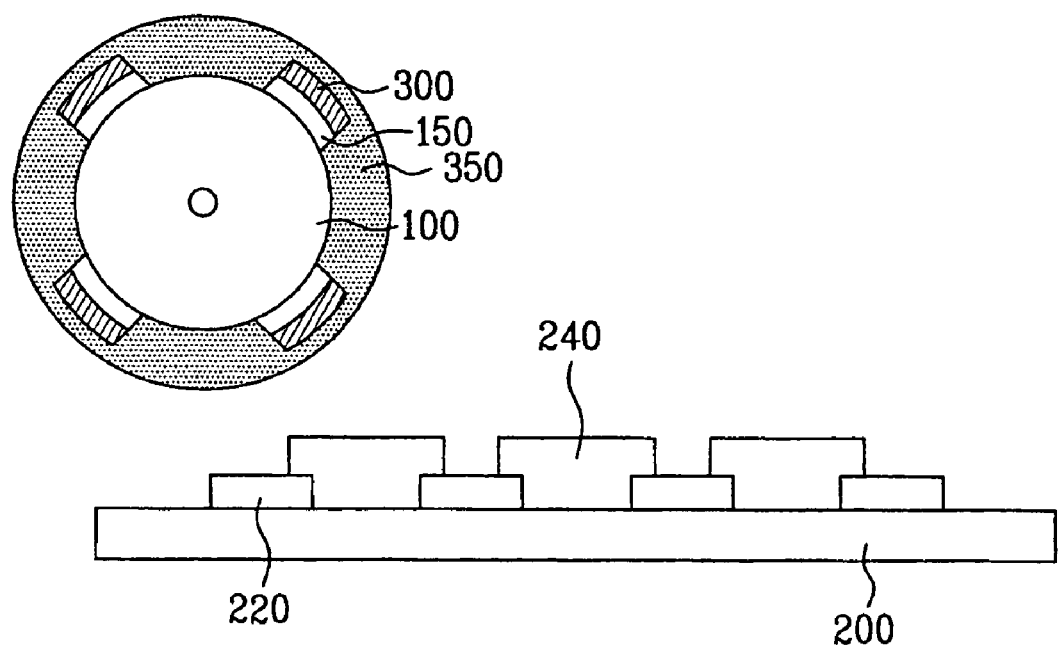
Figure 7E:
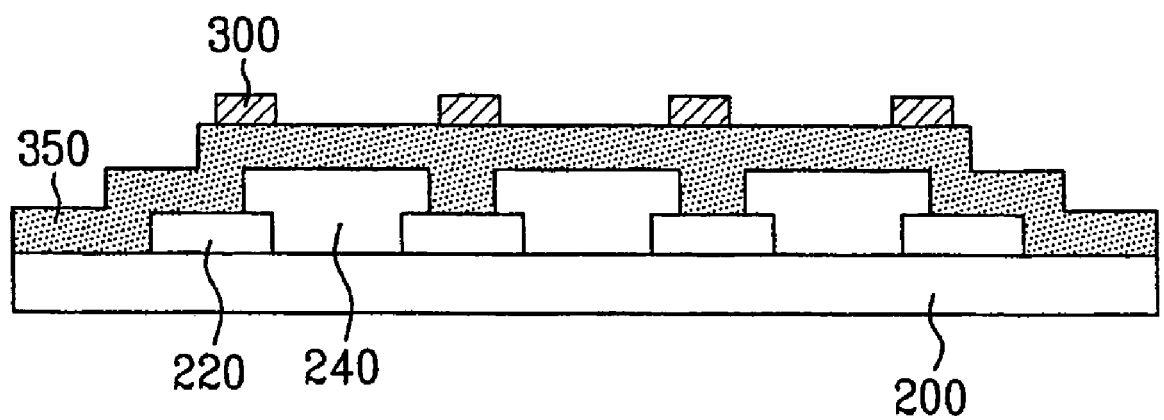

Afterwards, as shown in FIG. 7D and FIG. 7E, the printing roll 100 is rotated on the substrate 200 where the light-shielding layer and the color filter layer 240 are formed, so that the column spacer 300 and the overcoat layer 350 are simultaneously transferred onto the substrate 200, thereby transferring the overcoat layer 350 and the column spacer 300 to the substrate 200.

The column spacer 300 and the overcoat layer 350 are formed of the same material as that of the first embodiment.

SIXTH EMBODIMENT

FIG. 8A to FIG. 8F are sectional views illustrating a method of forming a substrate for an LCD device according to the sixth embodiment of the present invention.

Figure 8A:
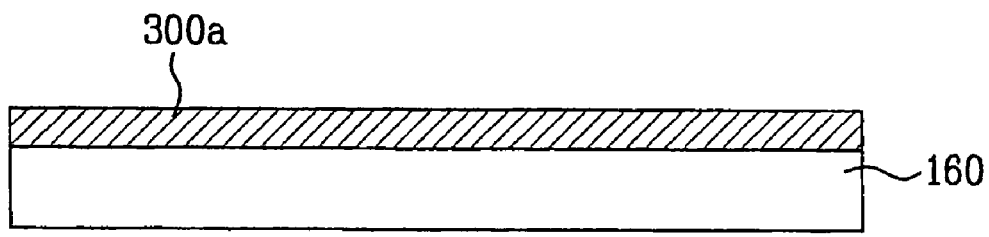
FIG. 8A to FIG. 8F are sectional views illustrating a method of forming a substrate for an LCD device according to the sixth embodiment of the present invention.
Figure 8B:
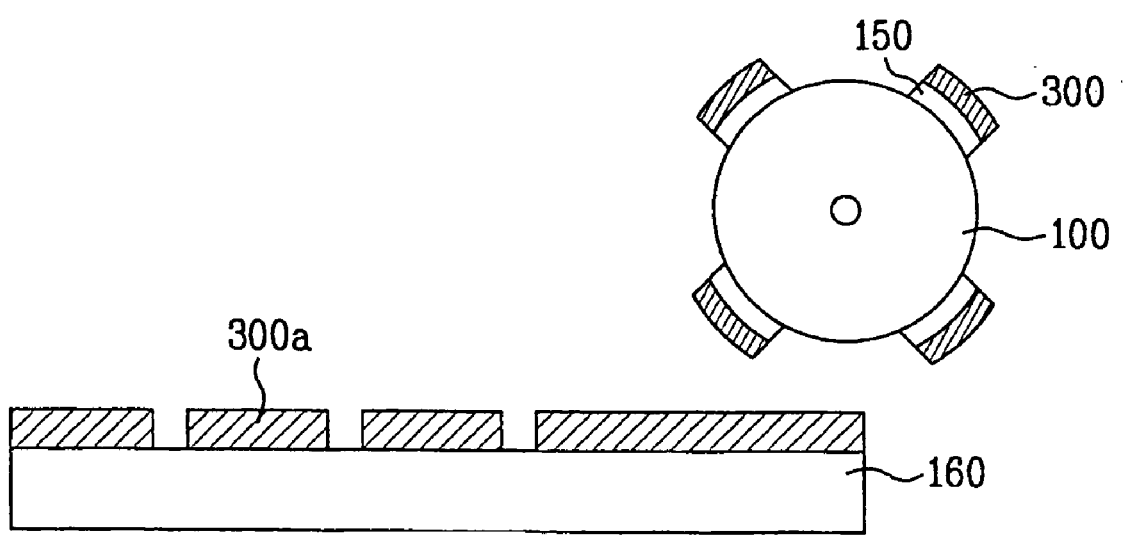
Figure 8C:
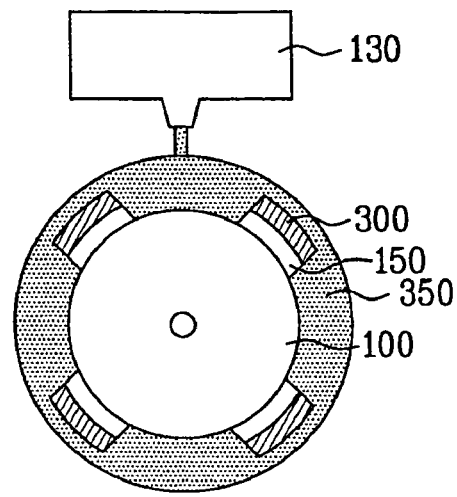
Figure 8D:
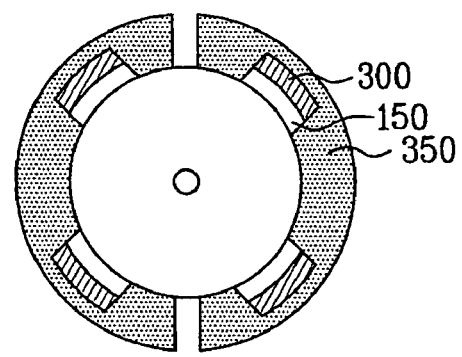
Figure 8D:
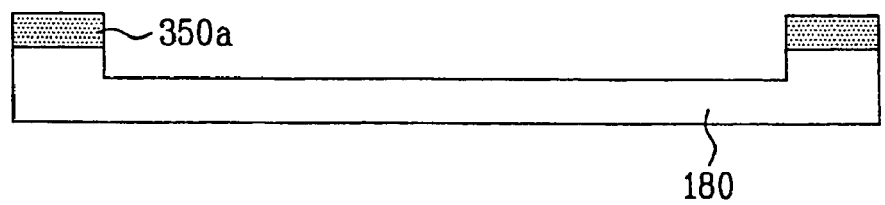
Figure 8E:
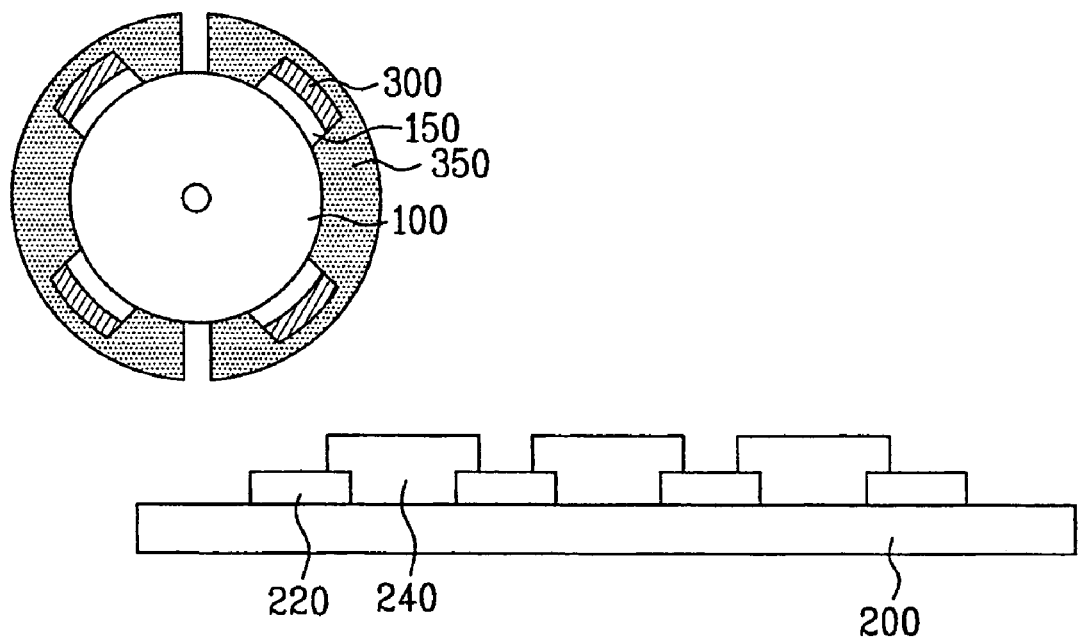
Figure 8F:
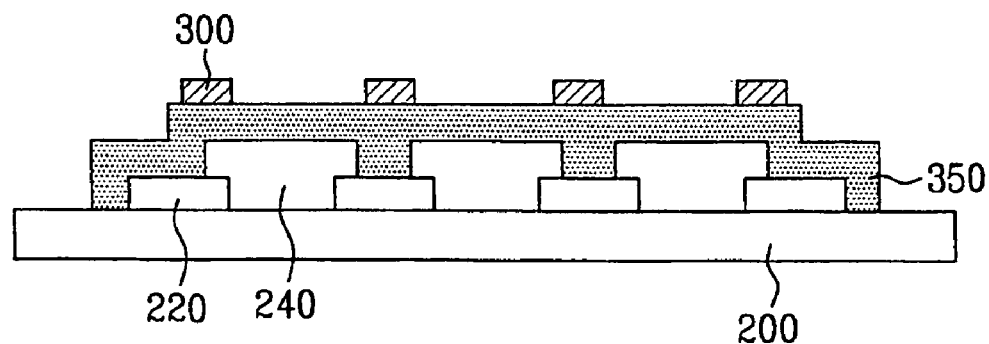

The sixth embodiment is similar to the fifth embodiment except that a predetermined region of the overcoat layer 350 is additionally removed after the overcoat layer is deposited on the printing roll 100 (see FIG. 7C). Therefore, the same reference numbers will be used throughout the drawings to refer to the same or like parts, and their description will be omitted. That is, since FIG. 8A to FIG. 8C are similar to FIG. 7A to FIG. 7C, their description will be omitted. FIG. 8D to FIG. 8F will now be described.

As shown in FIG. 8D, the printing roll 100 provided with the column spacer 300 and the overcoat layer 350 is rotated on the second printing plate 180 provided with a convex having a predetermined shape. Thus, some region 350a of the overcoat layer corresponding to a region where the column spacer 300 is not formed is transferred onto the convex of the second printing plate 180 and then removed.

Afterwards, as shown in FIG. 8E and FIG. 8F, the printing roll 100 is rotated on the substrate 200 where the light-shielding layer 220 and the color filter layer 240 are formed, so that the column spacer 300 and the overcoat layer 350 are simultaneously transferred onto the substrate 200, thereby completing the overcoat layer 350 and the column spacer 300 on the substrate 200.

At this time, in the same manner as the fifth embodiment, after the overcoat layer 350 and the column spacer 300 are formed on the substrate 200, it is preferable that the sealant is formed at both sides of the substrate where the overcoat layer is removed.

Meanwhile, in the first to third embodiments, the heights of the overcoat layer 350 and the column spacer 300 can be modified properly by controlling the amount of the pattern material discharged from the printing device 130. In this case, a printing device shown in FIG. 9 is preferably used.

Figure 9A:
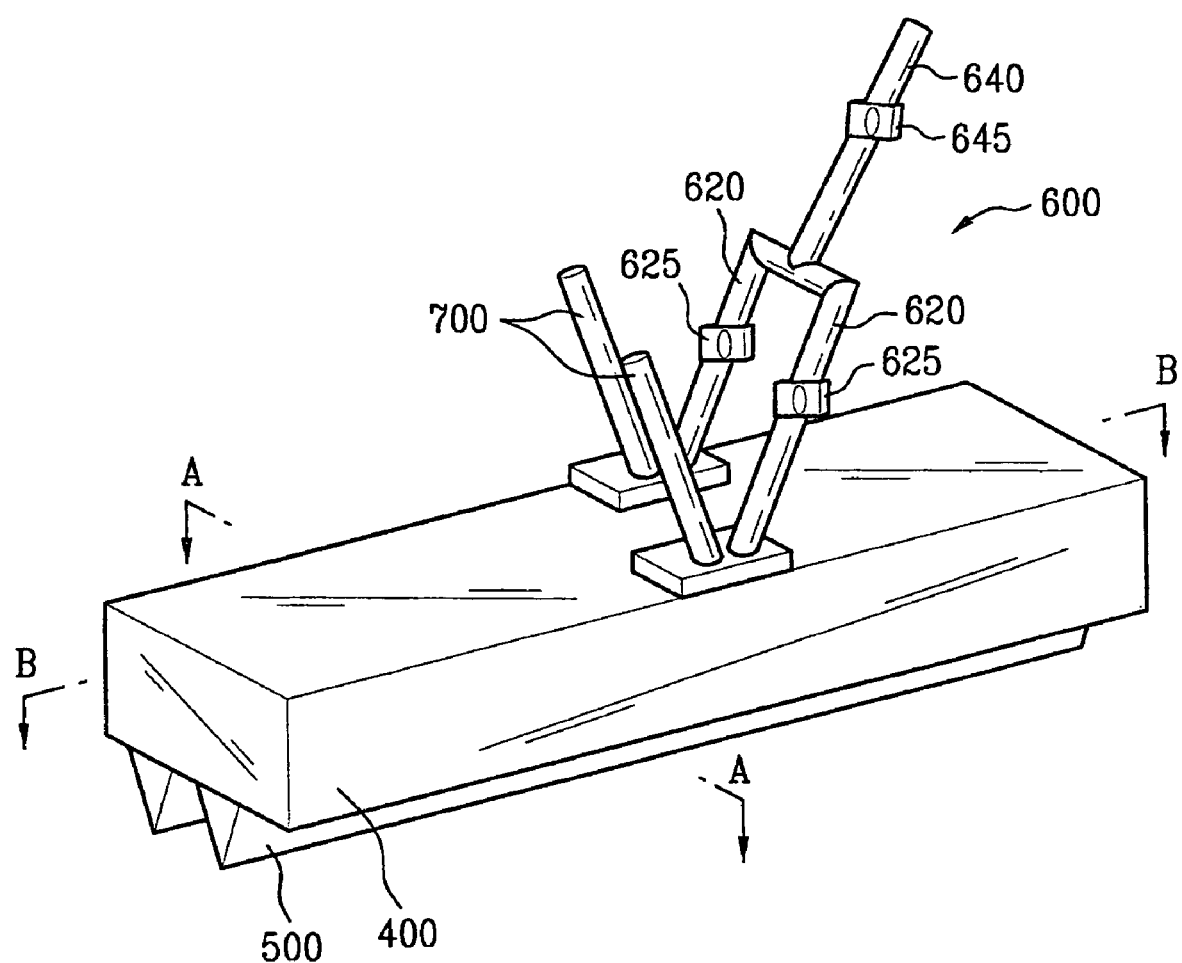
FIG. 9A is a perspective view illustrating a printing device according to the present invention.
Figure 9B:
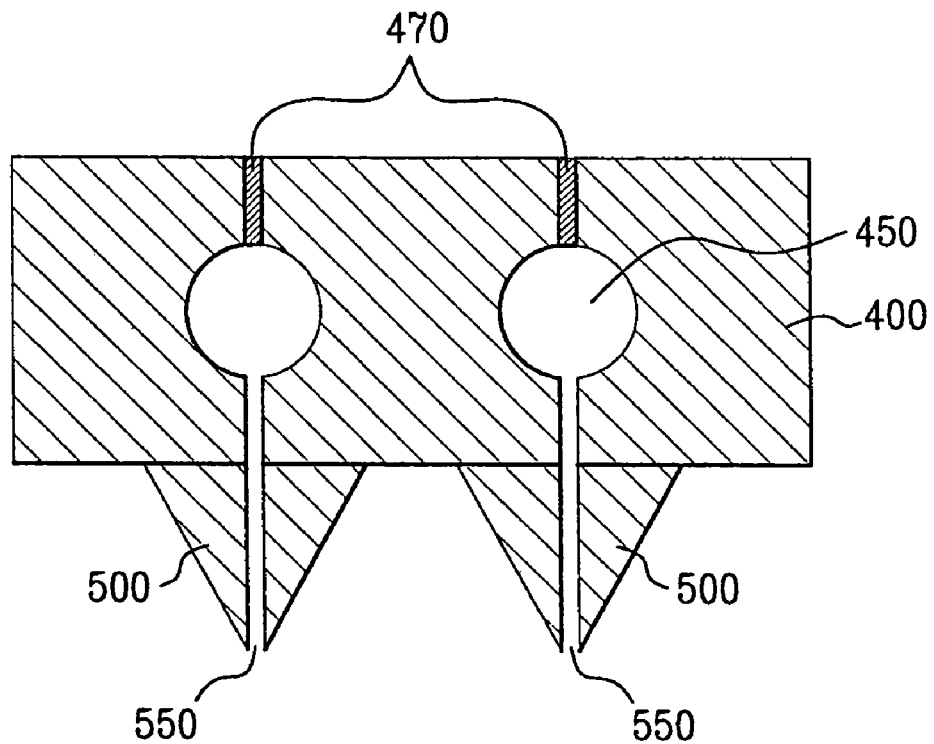
FIG. 9B is a sectional view taken along line A-A of FIG. 9A.
Figure 9C:
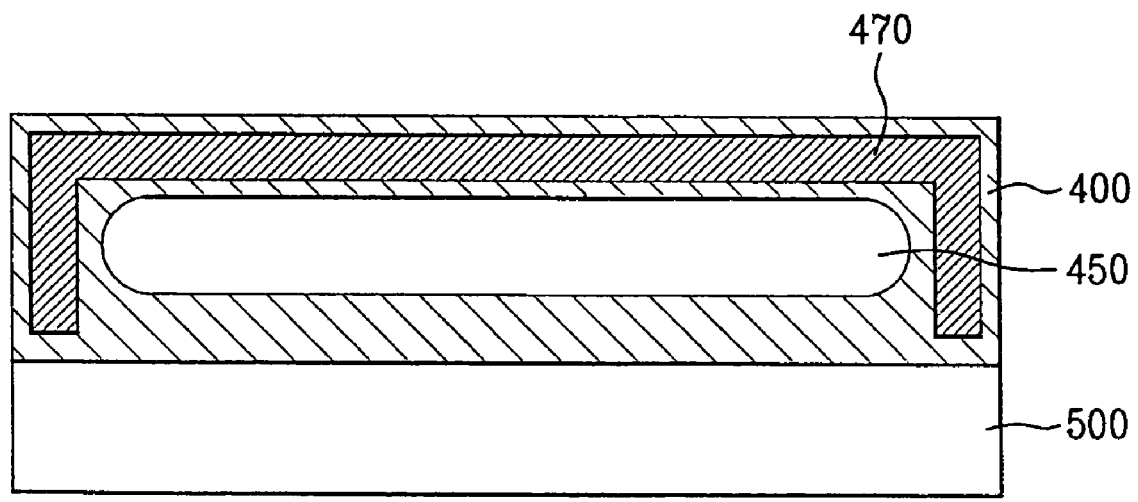
FIG. 9C is a sectional view taken along line B-B of FIG. 9A.

FIG. 9A is a perspective view illustrating a printing device according to the present invention, FIG. 9B is a sectional view taken along line A-A of FIG. 9A, and FIG. 9C is a sectional view taken along line B-B of FIG. 9A. Since the printing device includes a plurality of nozzle portions that can separately control the amount of the discharged pattern material, it is possible to easily control the amount of the pattern material coated on the printing roll, thereby facilitating thickness control of the pattern. Hereinafter, the printing device will be described in more detail with reference to FIG. 9A to FIG. 9C.

As shown in FIG. 9A, the printing device of the present invention includes a body portion 400, a plurality of nozzle portions 500 formed below the body portion 400, a supply tube 600 for supplying the pattern material to the body portion 400, and a exhaust tube 700 draining the pattern material from the body portion 400. Although two nozzle portions 500 are formed in the drawing, they are not limited to such case.

Referring to FIG. 9B and FIG. 9C, a plurality of grooves 450 are formed inside the body portion 400 to receive the pattern material therein.

The nozzle portions 500 are provided with slits 550 connected with the grooves 450, so that the slits 550 can discharge the pattern material to be coated on the printing roll.

Further, a spacer 470 is formed inside the body portion 400, and the size of each slit 550 is controlled by controlling the width of the spacer 470.

Referring to FIG. 9A, the supply tube 600 connected with the body portion 400 includes a plurality of sub supply tubes 620 and a main supply tube 640. The sub supply tubes 620 are respectively connected with the grooves 450 to supply the pattern material to the grooves 450. The main supply tube 640 connects the sub supply tubes 620 with each other.

Furthermore, the main supply tube 620 is provided with a main valve 645 to control a flow rate of the pattern material supplied to the sub supply tubes 620. The sub supply tubes 620 are provided with a sub valve 625 to control the flow rate of the pattern material supplied to the grooves 450.

As described above, after the pattern material is received in the grooves 450 through the sub supply tubes 620, they are coated on the printing roll through the slits 550. At this time, the amount of the pattern material discharged to the slits 550 is wholly controlled through the main valve 645. In addition, the amount of the pattern material discharged to the slits 550 is separately controlled through the sub valve 625. Therefore, the discharge amount of the pattern material can freely be controlled. This could easily control the pattern material coated on the printing roll.

As described above, the method of manufacturing a substrate for an LCD device has the following advantages.

First, since the column spacer pattern is formed using the printing roll, a device of high cost is not required unlike the related art photolithographic process. Also, since no exposing and developing processes are required, the process steps can be reduced. Particularly, since both the column spacer pattern and the overcoat layer pattern are formed in one printing roll, the column spacer and the overcoat layer can be formed simultaneously on the substrate through the transfer process of one time. This reduces the process time and thus facilitates mass production.

Second, no photoinitiator is required to constitute the material of the column spacer and the overcoat layer because the photolithographic process is not used.

Finally, since the printing roll including the plurality of nozzle portions is used, it is possible to easily control the heights of the column spacer and the overcoat layer.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of forming a substrate for an LCD device comprising the steps of:
   a) forming a column spacer pattern on a printing roll;
   b) forming an overcoat layer pattern on an entire surface of the printing roll overlying the column spacer pattern; and
   c) rotating the printing roll on the substrate to simultaneously transfer the overcoat layer pattern and the column spacer pattern having a different shape from the overcoat layer pattern onto the substrate;
   wherein rotating the printing roll on the substrate to transfer the overcoat layer pattern comprises leaving an uncovered portion of the substrate corresponding to a gap on the printing roll;
   forming a sealant on the uncovered portion of the substrate.

2. The method according to claim 1, wherein step a) further comprises depositing a spacer material on the printing roll using a printing device, and rotating the printing roll on a printing plate provided with a projection having a predetermined shape.

3. The method according to claim 2 wherein rotating the printing roll comprises transferring the spacer material onto the projection of the printing plate and leaving a remaining portion of the spacer material to form the column spacer pattern on the printing roll.

4. The method according to claim 1, wherein step a) further comprises depositing a spacer material on a recess having a predetermined shape formed in a printing plate, and rotating the printing roll on the printing plate.

5. The method according to claim 4, wherein rotating the printing roll comprises transferring the spacer material onto the printing roll to form the column spacer pattern on the printing roll.

6. The method according to claim 1, wherein step a) further comprises depositing a spacer material on a printing plate, forming a convex structure having a predetermined shape on the printing roll, and rotating the printing roll on the printing plate.

7. The method according to claim 6, wherein rotating the printing roll comprises transferring a portion of the spacer material onto the convex structure to form the column spacer pattern on the printing roll.

8. The method according to claim 1 further comprising, after step b), the step of rotating the printing roll having the column spacer and the overcoat layer pattern onto a second printing plate that includes a convex structure having a predetermined shape.

9. The method according to claim 8 wherein rotating the printing roll comprises transferring an overcoat layer pattern onto the convex structure and leaving the gap on the printing roll that corresponds to a region where the column spacer is not formed.

10. The method according to claim 1 further comprising the step of forming a sealant on the overcoat layer pattern.

11. The method according to claim 1, wherein the substrate includes a light-shielding layer and a color filter layer formed thereon.

12. The method according to claim 11, wherein the column spacer pattern is formed on the light-shielding layer.

13. The method according to claim 1, wherein the column spacer pattern comprises an acrylic material.

14. The method according to claim 1, wherein the forming the column spacer pattern comprises forming one of a ball type spacer or a fixed type spacer dispersed into the acrylic material.

15. The method according to claim 1, wherein forming an overcoat layer pattern comprises adding an adhesive enhancer to an acrylic material.

16. The method according to claim 1, wherein step a) or the step b) is performed using a printing device that includes a body portion and a plurality of nozzle portions formed below the body portion, the body portion including a plurality of grooves to receive a pattern material therein and each nozzle portion including a slit connected with the grooves to discharge the pattern material.

17. A method of forming a substrate for an LCD device comprising the steps of:

forming a light-shielding layer and a color filter layer on the substrate;

forming a column spacer pattern on a printing roll;

forming an overcoat layer pattern on an entire surface of the printing roll overlying the column spacer pattern; and rotating the printing roll on the substrate to simultaneously transfer the overcoat layer pattern and the column spacer pattern having a different shape from the overcoat layer pattern onto the substrate, wherein the column spacer pattern overlies the overcoat layer and is substantially aligned with the light-shielding layer;

wherein forming the column spacer pattern on the printing roll comprises depositing a spacer material on the printing roll using a printing device, and rotating the printing roll on a printing plate, the printing plate having a spacer pattern thereon.

18. The method of claim 17, wherein simultaneously transferring the overcoat layer pattern comprises leaving a portion of the substrate uncovered, and wherein the method further comprises forming a sealant on the portion of the substrate.

19. The method according to claim 17, wherein rotating the printing roll comprises transferring the spacer material onto the spacer pattern of the printing plate and leaving a remaining portion of the spacer material on the printing roll to form the column spacer pattern.

20. The method according to claim 17, wherein forming a column spacer pattern on the printing roll comprises rotating the printing roll on a printing plate, the printing plate including a recess having a predetermined shape, wherein the recess is filled with column spacer material.

21. The method according to claim 20, wherein rotating the printing roll comprises transferring the spacer material onto the printing roll to form the column spacer pattern on the printing roll.

22. The method according to claim 17, wherein forming a column spacer pattern further comprises depositing a spacer material on a printing plate, forming a convex structure having a predetermined shape on the printing roll, and rotating the printing roll on the printing plate.

23. The method according to claim 22, wherein rotating the printing roll comprises transferring a portion of the spacer material onto the convex structure to form the column spacer pattern on the printing roll.

24. The method according to claim 23, wherein the method further comprises, after forming an overcoat layer, rotating the printing roll onto a second printing plate that includes a convex structure having a predetermined shape, transferring a portion of the overcoat layer onto the convex structure, and leaving a gap on the printing roll that corresponds to a region where the column spacer is not formed.

25. The method according to claim 17, wherein forming an overcoat layer pattern on the printing roll comprises using the printing device to deposit an overcoat layer onto the printing roll overlying the column spacer pattern.

* * * * *

UNITED STATES PATENT AND TRADEMARK OFFICE
CERTIFICATE OF CORRECTION

PATENT NO.      : 7,579,043 B2                              Page 1 of 1
APPLICATION NO. : 11/207241
DATED           : August 25, 2009
INVENTOR(S)     : Tae Young Oh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 783 days.

Signed and Sealed this

Fourteenth Day of September, 2010

David J. Kappos
*Director of the United States Patent and Trademark Office*